(12) United States Patent  
Kervadec et al.

(10) Patent No.: US 9,769,010 B2
(45) Date of Patent: Sep. 19, 2017

(54) INHERITANCE OF UNIVERSAL RESOURCE IDENTIFIER (URI) PARAMETERS

(71) Applicant: Orange, Paris (FR)

(72) Inventors: Sylvain Kervadec, Sens de Bretagne (FR); Claudia Becker, Rennes (FR); Olivier Vivolo, Rennes (FR)

(73) Assignee: ORANGE, Paris (FR)

( * ) Notice: Subject to any disclaimer, the term of this patent is extended or adjusted under 35 U.S.C. 154(b) by 75 days.

(21) Appl. No.: 14/433,833

(22) PCT Filed: Oct. 7, 2013

(86) PCT No.: PCT/FR2013/052379
§ 371 (c)(1),
(2) Date: Apr. 6, 2015

(87) PCT Pub. No.: WO2014/057197
PCT Pub. Date: Apr. 17, 2014

(65) Prior Publication Data
US 2015/0280965 A1    Oct. 1, 2015

(30) Foreign Application Priority Data

Oct. 9, 2012 (FR) .................................... 12 59623

(51) Int. Cl.
*G06F 15/16* (2006.01)
*H04L 12/24* (2006.01)
(Continued)

(52) U.S. Cl.
CPC ...... *H04L 41/0293* (2013.01); *H04L 65/4084* (2013.01); *H04L 67/02* (2013.01);
(Continued)

(58) Field of Classification Search
None
See application file for complete search history.

(56) References Cited

U.S. PATENT DOCUMENTS 9,467,493 B2*  10/2016  Thang ................. H04L 65/4084
9,607,132 B2*   3/2017  van Brandenburg ... G06F 21/10
(Continued)

FOREIGN PATENT DOCUMENTS

WO    2004051453 A1    6/2004
WO    2011038032 A2    3/2011

OTHER PUBLICATIONS

International Search Report dated Jan. 24, 2014 for corresponding International Application No. PCT/FR2013/052379, filed Oct. 7, 2013.

(Continued)

*Primary Examiner* — Younes Naji
(74) *Attorney, Agent, or Firm* — David D. Brush; Westman, Champlin & Koehler, P.A.

(57) ABSTRACT

A method is provided for accessing a multimedia content containing at least one data segment. This data segment is accessible via a document describing the content. The method includes a first step of obtaining the document describing the content, from which document at least a first universal address of a segment is generated; a second step of obtaining at least one parameter associated with the universal address of the document describing the content; a step of reading at least one address generator rule in the document describing the content; and as a function of the address generator rule, of the first universal address of the segment, and of the parameter that has been obtained, a last step of generating the second universal address for the segment. Also provided is a method of generating a document that is suitable for use in the context of the access method.

14 Claims, 3 Drawing Sheets

(51) Int. Cl.
*H04N 21/2343* (2011.01)
*H04N 21/258* (2011.01)
*H04N 21/6373* (2011.01)
*H04L 29/06* (2006.01)
*H04L 29/08* (2006.01)

(52) U.S. Cl.
CPC . *H04N 21/23439* (2013.01); *H04N 21/25816* (2013.01); *H04N 21/6373* (2013.01)

(56) References Cited

U.S. PATENT DOCUMENTS

| | | |
|---|---|---|
| 2012/0030224 A1 | 2/2012 | Cohen et al. |
| 2012/0185607 A1* | 7/2012 | Rhyu ................ H04N 21/6125 709/231 |
| 2012/0226770 A1* | 9/2012 | Schapira ............ H04L 67/2804 709/217 |
| 2013/0246643 A1* | 9/2013 | Luby ................ H04N 21/23439 709/231 |
| 2014/0096271 A1* | 4/2014 | Wang ...................... G06F 21/10 726/30 |
| 2014/0201335 A1* | 7/2014 | Wang .................. H04L 65/4092 709/219 |
| 2015/0215369 A1* | 7/2015 | Yamagishi .............. G06F 13/00 709/219 |
| 2015/0271179 A1* | 9/2015 | Wang ...................... H04L 63/10 726/30 |

OTHER PUBLICATIONS

Anonymous, "Text of ISO/IEC IS 23009-1 Media Presentation Description and Segment Formats" 98. MPEG Meeting; Nov. 28, 2011-Feb. 12, 2012; Geneva; )Motion Picture Expert Group or ISO/IEC JTC1/SC29/WG11),, No. N12329, Jan. 6, 2012 (Jan. 6, 2012), XP030018824.

* cited by examiner

INHERITANCE OF UNIVERSAL RESOURCE IDENTIFIER (URI) PARAMETERS

CROSS-REFERENCE TO RELATED APPLICATIONS

This application is a Section 371 National Stage Application of International Application No. PCT/FR2013/052379, filed Oct. 7, 2103, which is incorporated by reference in its entirety and published as WO 2014/057197 A1 on Apr. 17, 2014, not in English.

TECHNICAL FIELD

The invention relates to multimedia content communications.

The term "multimedia content" is used to mean any audio or video content, or more generally any other digital content.

The invention relates more specifically to transmitting and receiving multimedia content over a network, in particular to continuously downloading multimedia content over a network, which is also known as "streaming".

The invention relates more particularly to communication using universal addresses for content.

The invention applies in particular to any client terminal (referred to below merely as a "terminal") that is capable of communicating over a telecommunications network in order to access multimedia content by means of a universal address, also known as a uniform resource identifier (URI).

STATE OF THE ART

In order to access multimedia content, a client terminal generally has recourse to a universal address or URI. Such an address provides both access to the content and indications about the associated protocol for consuming it (by way of example, when the content is video content, the term "consuming" is used to mean "viewing"). A URI is a string of characters identifying a physical or abstract resource, and complying with the syntax of a set of standards issued by the Internet engineering task force (IETF), and in particular its specification RFC 3986 (specification: Uniform resource identifier (URI): generic syntax). Such a universal address may for example have the following form dvb://content1, rtsp://content2, HTTP://content3, ftp://content4, etc.

Access to multimedia content may be direct (triggered by a single request using a single URI), or indirect, with the URI then providing parameters that make it possible to access the service via a second request. A conventional illustration is a video on demand service: a first step consists in the terminal downloading a document that describes the parameters for accessing the service (session description protocol (SDP)) by using the hyper text transport protocol (HTTP), i.e. a client-server communication protocol developed for Internet networks and in particular for the web; in a second step, the service actually begins, i.e. the client terminal can receive and display the video by using information provided in the document (in this example the SDP). It should be observed that the document may be a computer file or a data set descriptive of the content that is accessible at a certain address. Below, depending on the context, use is made of the term "description file" or "document". It should be observed that this type of access to the service may require the presence of a server (in particular for a point to point or "unicast" communication), or it need not require the presence of a server (for a point to multipoint communication of the "broadcast" or "multicast" type). In particular, the HTTP protocol is of the point to point (or "unicast") type, and as a result implies the presence of a server in order to process the request of a client referred to as the "HTTP client".

In this context of the HTTP protocol, for exchanging data between the client and the server, it is common practice to have recourse to a technique of the "adaptive streaming" type. This type of technique makes it possible in particular to provide a good user experience while taking account, for example, of variations in the bandwidth available over the connection between the client terminal and the content server. Conventionally, various qualities can be encoded for the same video, e.g. corresponding to different data rates. Each data rate is itself subdivided into time segments (known as content "fragments"). The descriptions of these various data rates and of the segmentation, and also of the content fragments, are made available to the client terminal by a service platform. In order to access the complete content, it is therefore necessary to know numerous URI addresses corresponding to multiple segments.

Several solutions exist for facilitating the distribution of such content in streaming, such as for example proprietary solutions, e.g. Microsoft Smooth Streaming, Apple HLS, Adobe Http Dynamic Streaming, or else the MPEG DASH standard, which is described below. These methods propose sending one or more intermediate description files to the client, which files may also be referred to as documents, or manifests, or indeed resources, and they contain the addresses of the various segments to different qualities of the multimedia content.

By way of example, MPEG DASH (for dynamic adaptive streaming over http—ISO/IEC standard 2309-1:2012(E)) is a standard from the ISO/IEC standards organization that is dedicated to streaming multimedia content over the Internet; it makes it possible in particular for peripherals connected to the network (TV, tablets, etc.) to consume multimedia content using the HTTP protocol. The HTTP request from a client in compliance with the MPEG DASH standard and sent to the server contains a universal address, or URI, e.g. of the uniform resource locator (URL) type, where a URL is a particular example of a URI that gives access to the multimedia content over the Internet network. Thus, with MPEG DASH, access to content conventionally takes place in two stages:

1) Obtaining a description document, typically by downloading a file containing specifically the addresses of media segments of the multimedia content, known as a media presentation description (MPD). This downloading conventionally takes place using an HTTP URL, however it could also take place using a universal address (URI) describing some other protocol (e.g. ftp://mydescriptionfile).

2) Obtaining media segments, typically by downloading, using content addresses in the description document. This downloading conventionally takes place via an HTTP URL, however it could also take place via a universal address (URI) describing some other protocol (e.g. dvb://mycontent-segment).

In certain situations, content may be subjected to particular constraints. For example, access to the content may be protected, and this protection assumes that the terminal has been identified, where such identification naturally varies as a function of the user, and assumes that the rights of the user has been checked, which rights may furthermore vary over time. The identification and the checking of user rights are traditionally performed by a service platform, and the result is transmitted to the distribution server by one or more parameters associated with the URI universal address, which are referred to below as the URI parameters.

In order to associate these specific parameters with a demand from a terminal among all of the content requests described in the description file, it is necessary under such circumstances for the system to generate as many documents or description files as there are demands from terminals, which is complex and loads the service platform or the distribution server.

The invention provides a solution that does not present the drawbacks of the prior art.

THE INVENTION

To this end, in a functional aspect, the invention provides a method of generating a document describing a multimedia content containing at least one data segment that is accessible via at least a first universal address from said document, said method of generating the document being characterized in that it includes at least one step of writing at least one universal address generator rule in the document, said generator rule being suitable for generating a second universal address for the segment from both the first universal address and at least one parameter associated with the universal address of the document describing the content.

In the invention, it is thus possible to make provision for introducing one or more personalized parameters in the second or final address for the segment of the multimedia content. The segment address as generated is more complete than the first address of the segment; in particular it may include parameters associated with the client who demanded the multimedia content, unlike the first address of the prior art which can be personalized only by generating a specific description document for each client.

The parameters associated with the universal address of the description document (URI parameters) are typically authentication parameters that are naturally specific to each client. Thus, the invention provides the advantage of making it possible both to generate a single description document for the content (manifest, description file, etc.) for all clients, while simultaneously personalizing the addresses of content segments with parameters that are associated very simplify with the address of the description document.

In a particular implementation of the invention, a method of generating a description document as described above is also characterized in that the universal address generator rule specifies the parameters obtained that need to be taken into account in order to generate a second universal address for the segment.

In this implementation, it is thus possible to name explicitly the universal address parameters that are to be taken into account when generating the second or final address of the segment. Typically, this involves the description document specifying the URI parameters that are to be inserted, or passed, in the final address for the segment, e.g. a signature, a date, etc. It is thus possible to decide to give precedence to certain URL parameters, or to take no account of certain other parameters.

In a second particular implementation of the invention, that may be implemented instead of or together with the above implementation, a method as described above is further characterized in that the address generator rule indicates the order in which parameters that have been obtained need to be taken into account in order to generate a second universal address for the segment.

This implementation of the invention makes it possible to take account automatically and implicitly of the URL parameters that are to be taken into account for generating the final address for the segment. The order specified in the generator rule may for example be the order of importance of the parameters from the point of view of the server. By means of the invention, this may be caused to vary from one machine to another since, under such circumstances, it suffices to change the content (the rule) of the description file.

In another functional aspect, the invention provides a method of accessing a multimedia content containing at least one data segment that is accessible via a document describing the content, said access to the segment taking place via a second universal address of the segment, said access method being characterized in that it comprises the following steps:

obtaining the document describing the content, from which document at least a first universal address of a segment is generated;

obtaining at least one parameter associated with the universal address of the document describing the content;

reading at least one address generator rule in the document describing the content; and as a function of the address generator rule, of the universal address of the segment, and of the parameter that has been obtained, generating the second universal address for the segment.

Knowing both the description document and the parameters that are associated with the universal address of the description document, the client can thus apply the rule to include one or more of those parameters in the address of the multimedia content segment that is to be consumed. The second address, or final address, as generated for the segment is thus more complete than the first address, and it makes it possible in particular to personalize access to the segments of the content by introducing parameters that are associated with the client, typically authentication parameters that are naturally specific to the client. The invention thus provides the advantage of proposing a single document (manifest, description file, etc.) to all clients, since it is possible to personalize the addresses of the content segments as a function of parameters that are passed in simple manner with the address of the document.

In a material aspect, the invention also provides a multimedia content server suitable for generating a document describing a multimedia content containing at least one data segment that is accessible via a first universal address from said document, said content server including a module for writing at least one universal address generator rule in the document, said generator rule being suitable for generating a second universal address for the segment on the basis of the first universal address, of the universal address generator rule, and of at least one parameter associated with the universal address of the document describing the content.

In another material aspect, the invention also provides a terminal suitable for accessing a multimedia content containing at least one data segment that is accessible via a document describing the content, said access taking place via a second universal address for the segment, said terminal being characterized in that it comprises:

a module for obtaining the document describing the content, from which document at least a first universal address for a segment is generated;

a module for obtaining at least one parameter associated with the universal address of the document describing the content;

a module for reading at least one address generator rule in the document describing the content; and a module for generating a second universal address for the segment as a function of the address generator rule, of the first universal address of the segment, and of the parameter that has been obtained.

In another material aspect, the invention provides a computer program including code instructions for performing a method of generating a document describing a multimedia content as described above, when the program is executed by a processor.

In another material aspect, the invention also provides a computer program including code instructions for performing a method of accessing a multimedia content as described above, when the program is executed by a processor.

The material aspect of the invention provides at least the same advantages as those procured y the methods of the functional aspect.

The invention can be better understood on reading the following description given by way of example and made with reference to the accompanying drawings.

DETAILED DESCRIPTION OF AN IMPLEMENTATION ILLUSTRATING THE INVENTION

Figure 1:
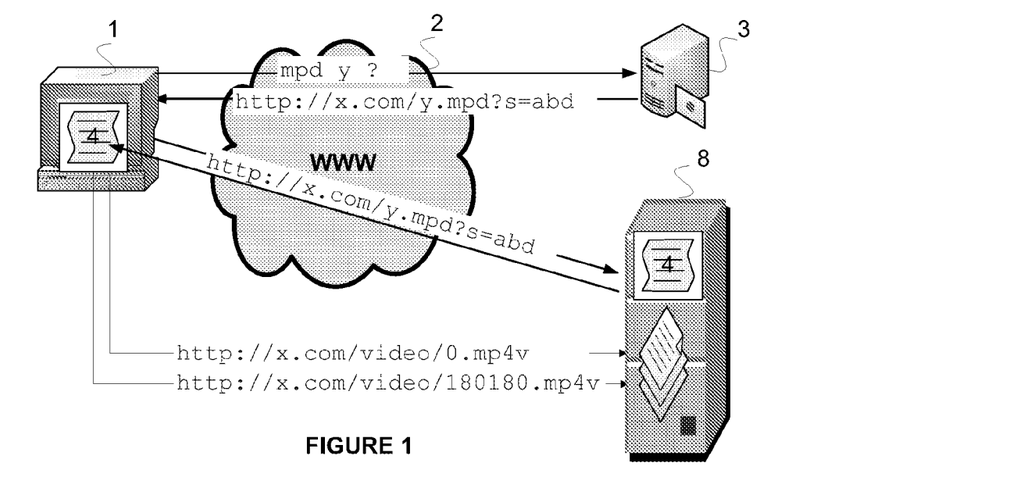
FIG. 1 shows a streaming architecture based on using the HTTP protocol over the Internet in the prior art.

FIG. 1 shows a streaming architecture based on using the HTTP protocol over an Internet type network in the prior art. Conventionally, a client terminal (1) seeks to enter into communication with a content server (8) in order to download multimedia content made up of one or more media (audio, video, etc.).

In the example below, as explained above, the streaming context involved makes use of the MPEG DASH standard.

The terminal (1) begins by interrogating a service platform (3) in order to obtain an address (here a URL, but more generally a URI type universal address) for the multimedia content description document (y); below, this document is a file of the MPD type (y.mpd).

The service platform (3) answers by providing the terminal with the address of the MPD file, in this example this is a URL "HTTP://x.com/y.mpd" representing a file y of type mpd that may be downloaded (or streamed) from the site "x.com".

The service platform (3) may add a certain number of parameters to the URI for use by the client. According to the IETF specification RFC 3986, which describes the generic syntax of URIs, these parameters are introduced by the "?" symbol. For further details about this mechanism for inserting parameters in a URI, the person skilled in the art should refer to RFC 3986. For example, in the context of distribution content associated with authentication, the service platform may add an authentication token to the URI, and in this example the token is represented by the string "s=abd", being an authentication parameter for the client for use by the content delivery platform. In response to its request for a description file, the client thus receives a URL "HTTP://x.com/y.mpd?s=abd" comprising both:

the universal address of the file itself (HTTP://x.com/y.mpd); and an authentication parameter (abd).

On the basis of this URI, the description document (4) can be downloaded from the content server (8), the parameter abd enabling the server to authenticate the client.

An example MPD file in compliance with the MPEG/DASH standard is described below. The pertinent fields in the context of the invention, serving in particular to generate the first universal address, are presented in italics.

TABLE 1 example of an MPEG/DASH-compliant MPD file

```
<?xml version="1.0"?>
<MPD
    xmlns:xsi="HTTP://www.w3.org/2001/XMLSchema-instance"
    xmlns="urn:mpeg:DASH:schema:MPD:2011"
    xsi:schemaLocation="urn:mpeg:DASH:schema:MPD:2011
    DASH-MPD.xsd"
    type="dynamic"
    minimumUpdatePeriod="PT2S"
    timeShiftBufferDepth="PT30M"
    availabilityStartTime="2011-12-25T12:30:00"
    minBufferTime="PT4S"
    profiles="urn:mpeg:dash:profile:isoff-live:2011">
    <BaseURL>HTTP:// x.com/</BaseURL>
    <Period>
        <!-- Video -->
        <AdaptationSet
            mimeType="video/mp4"
            codecs="avc1.4D401F"
            frameRate="30000/1001"
            segmentAlignment="true"
            startWithSAP="1">
            <BaseURL>video/</BaseURL>
            <SegmentTemplate timescale="90000"
            initialization="$Bandwidth$/init.mp4v"
    media="$Bandwidth$/$Time$.mp4v">
                <SegmentTimeline>
                    <S t="0" d="180180" r="432"/>
                </SegmentTimeline>
            </SegmentTemplate>
            <Representation id="v1" width="640"
            height="480" bandwidth="500000"/>
            <Representation id="v2" width="1280"
            height="720"bandwidth="2000000"/>
        </AdaptationSet>
    </Period>
</MPD>
```

The MPD file makes it possible to generate multimedia content addresses referred to herein as "first" universal addresses in order to distinguish them from addresses that are generated in the context of the invention and that are referred to herein as "second" universal addresses; the first addresses, in accordance with the prior art of the MPEG/DASH standard may be generated either:

directly (the URL of the segment is specified directly in the file); or indirectly, via a process for constructing media segment URLs.

This construction makes use of a mechanism prior to resolving universal addresses (URIs) described in the above-mentioned RFC 3986. The client terminal must interpret certain fields and modify them appropriately in order to construct the first universal address (URL or URI) of the media segment.

This resolution of a URI is performed using the element BaseURL which may be present at various levels in the hierarchy of the MPD.

In this example, the URLs are constructed with the help of two fields "BaseURL" ("HTTP://x.com/" and "video/") "SegmentTemplate".

The "SegmentTemplate" specified by the MPEG/DASH standard is a generic method for constructing intermediate URI addresses on the basis of various identifiers, and in this example:

$Time$: to be replaced by the time at the beginning of the media segment. This time is provided by the "SegmentTemplate" line that specifies in this example an offset of 180180 for each beginning of a new segment;

*$Number$: to be replaced by the order number of the desired media segment; and $Bandwidth$: to be replaced by the value of the "bandwidth" attribute of the targeted representation.

Thus, the first two URLs giving access to the first two video segments for a quality (or data rate) of 500 kilobits per second (kbps) in this example are as follows:

1. HTTP://x.com/video500000/0.mp4v; and
2. HTTP://x.com/video500000/180180.mp4v.

At present, MPEG DASH thus proposes a mechanism that enables first addresses (URLs or URIs) of media segments to be generated that include a certain number of parameters. This mechanism is sufficient so long as the URL parameters are common to all clients seeking to access the content. In contrast, if it is desired to personalize these parameters as a function of the client (conventionally in order to authenticate and check access or rights), the only solution is to generate an MPD description file that is specific for each client. That method is expensive (in terms of time and resources on content delivery platforms) since it requires a description document to be constructed on the fly for each client.

That is why the invention proposes generating segment addresses (URIs) automatically, which are referred to herein as second universal addresses in order to distinguish them from the first universal addresses, and which may include a certain number of parameters that may relate, for example, to the client terminal. In this example, a security parameter, specified as a parameter of the URL of the MPD file (s=abd), is introduced or passed when generating the second address of the segment. In addition to the first addresses that can be generated using the prior art, these second addresses thus include the personalized security parameter. In other words, the second segment addresses are adapted to each client terminal, even though they are generated from a single MPD description file.

Naturally, it is already known to pass a URL parameter (such as the above-described token) when demanding content and when there is only one segment (e.g. an audio segment) associated with the content demand and thus no indirection via a description file. However, when the content is accessible only via the description file, there does not exist at present any solution for passing the parameter to each of the segments, other than generating a specific file for each request.

Figure 2:
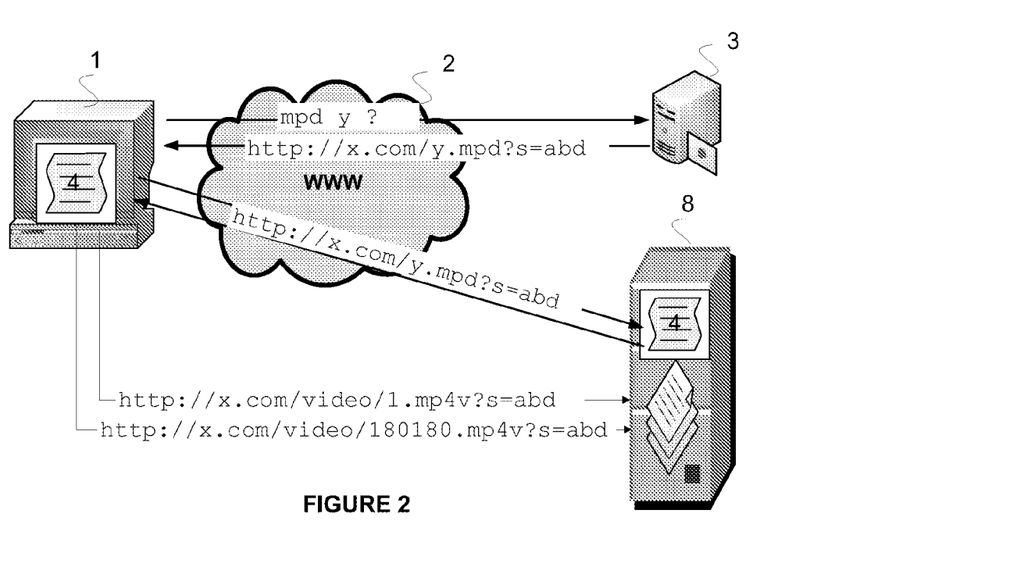
FIG. 2 shows a streaming architecture based on using the HTTP protocol over the Internet in an implementation of the invention.

FIG. 2 shows the principle of a streaming system in accordance with the invention.

The first steps of requesting and receiving the universal address of the description file (y.mpd) from the service platform (3), and requesting and receiving the description file itself from the content platform (8) are identical to those described with reference to FIG. 1.

Nevertheless, during a subsequent step, the invention enables the parameter associated with the URL address of the description file (here the token "s=abd" that was previously transmitted by the service platform as a URL parameter) is inserted by the client in each request demanding a media segment using a method that is described in greater detail with reference to FIG. 3.

Thus, the first two URLs for access to the first two video segments for a quality of 500 kbps in this example become:

1. HTTP://x.com/video500000/0.mp4v?s=abd; and
2. HTTP://x.com/video500000/180180.mp4v?s=abd.

Two advantages of the invention can thus clearly be seen compared with the prior art described with reference to FIG. 1:

By means of this new method, it is possible for the server to use the token present in the URL to verify each media segment. If the token for each media segment is valid, the server will indeed deliver the media segment. Otherwise, downloading fails. The mechanism is thus more secure than in the past.

Furthermore, there is no longer any need to generate a description file (y.mpd) for each client, since each client can personalize access to the various segments of the content by passing the parameters the client has received beforehand in the URL of the description file.

Figure 3:
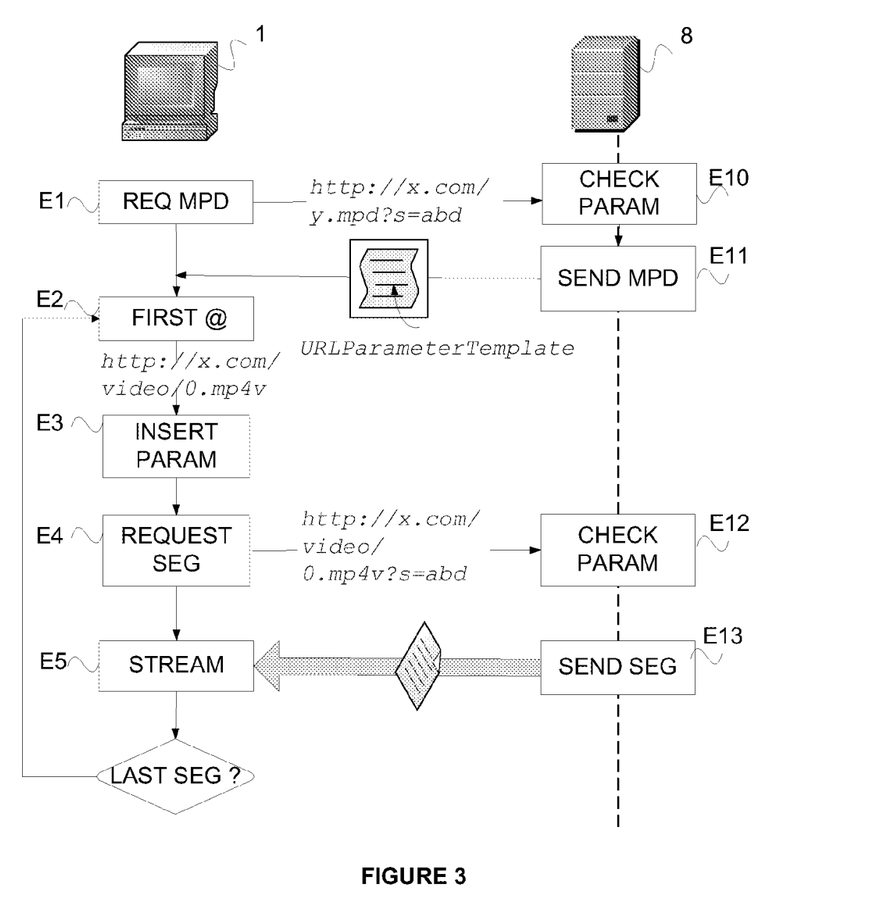
FIG. 3 is a timing diagram in an implementation of the invention.

FIG. 3 is in the form of a timing diagram showing the various steps of the mechanism of the invention.

It is based on exchanging and making use of a file y.MPD as modified below (fields in italics are new fields in accordance with the invention).

The new field URLParameters specifies that the inheritance mechanism of the invention is active. Naturally, other variants are possible. In particular, it may be considered that this field is optional, with its presence or absence being tested by the analysis model of the XML file present on the client terminal. If it is absent, it can be associated with a parameter by default.

The new field URLParameterTemplate serves to pass parameters to the (URL, URI) media segment addresses that are to be generated. The field URLParameterTemplate specifies in particular which fields of the file are to be reused in each media segment. In this example, only the "token" field is to be reused, however it is naturally possible to envisage reusing a larger number of parameters. It may be considered that this field is optional, with its presence or absence being tested by the analysis module of the XML file present in the client terminal. If it is absent, a parameter by default may likewise be associated therewith.

During a step E1, the terminal 1 requests the description file y.mpd, which file is transmitted thereto by the content server (8) during a step E10.

During a step E2, it generates a first universal address (HTTP://x.com/video/0.mp4v) of a content segment.

During a step E3, it generates a second universal address of the segment (HTTP://x.com/video/0.mp4v?s=abd) by inserting the authentication parameter "s=abd" that was transmitted thereto as a parameter of the description file address, in the second address of the segment in compliance with the (URLParameterTemplate) rule read in the description file.

During a step E4, it uses this second universal address to request the segment that is transmitted thereto by the content server during a step E12 after the server has verified the authentication parameters (s=abd). It can then consume the content during an optional step E5.

Test step E6 enables it to repeat steps E3 to E5 for another content segment, so long as there remain content segments for processing.

TABLE 2 example of an MPEG/DASH MPD file modified
in accordance with the invention

```
<?xml version="1.0"?>
<MPD>
    <BaseURL>HTTP://x.com/</BaseURL>
    <URLParameters> Yes </URLParameters>
    <Period>
        <!-- Video -->
        <AdaptationSet>
            <BaseURL>video/</BaseURL>
            <SegmentTemplate
            media="$Bandwidth$/$Number$.mp4v">
            </SegmentTemplate>
            <URLParameterTemplate parameters="?$signature$"/>
            <Representation id="v1" width="640" height="480"
            bandwidth="500000"/>
                <Representation id="v2" width="1280" height="720"
                bandwidth="2000000"/>
        </AdaptationSet>
    </Period>
</MPD>
```

In this first example, the parameters that need to be passed in order to generate the second universal address of the segment are mentioned explicitly in the rule; a syntax example is given in the file for passing the "signature" parameter:

<URLParameterTemplate parameters="?$signature$"/>

In a variant, the parameters that are to be passed for generating the second universal address are mentioned by their order, e.g. using the following syntax, which means that the first parameter to be passed is number 2, followed by number 1, and then number 3:

<URLParameterTemplate="2 1 3">

In another variant, described with reference to FIG. 4, the context is no longer that of distributing content by streaming over http, but that of streaming over real time protocol (RTP), with checking by the real time streaming protocol (RTSP). In a video on demand (VOD) service checked by RTSP, the establishment of the video session on demand passes via a first step of downloading information enabling the session to be started. This first step generally relies on the SDP protocol (IETF RFC 4566), which makes it possible in particular to describe which protocol is to be used for the VOD session, characteristics of the content (data rate, video and audio codec), etc., as shown in the table below. This information may be recovered via the prior downloading of a file (referred to as an "sdp" file), and used subsequently for setting up the streaming session between the client terminal and the server:

TABLE 3 example SDP file

```
File:audio.sdp
a=control:rtsp://movie.example.com/ost.wav m=audio 0
RTP/AVP 96
a=rtpmap:96 L8/22048/1
a=range:npt=0-262.243000
```

Figure 4:
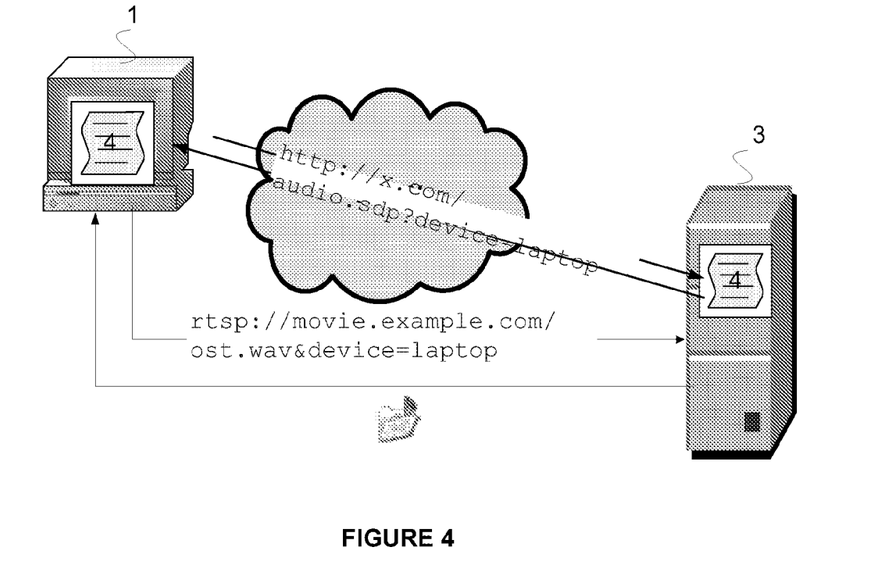
FIG. 4 shows a variant of an implementation of the invention.

As shown in FIG. 4, the invention may be applied directly to this application context.

It is assumed that the terminal 1 has obtained the SDP description file.

The parameters used during the request for downloading the SDP file are then used to construct the request enabling the session to be established. In particular, a parameter "device=laptop" is attached to the universal address of the SDP file and passed to recover the audio segment using the rtsp protocol. The media segment request takes the form:

rtsp://movie.example.com/ost.wav&device=laptop

In the same manner as in the example of Table 2, it is appropriate to insert new signaling in this sdp file enabling the invention to be activated.

Naturally, the implementation described above is given purely by way of non-limiting indication and numerous modifications may easily be applied thereto by the person skilled in the art without thereby going beyond the ambit of the invention.

The invention claimed is:

1. A method comprising:
generating a document accessible over a communications network through a universal address of the document, said document describing a multimedia content containing at least one data segment that is accessible via a first universal address from said document, wherein generating comprises:
at least one step of writing at least one universal address generator rule accessible through the universal address of the document, said at least one universal address generator rule being suitable for generating a second universal address for the at least one data segment, by taking into account, for generating said second universal address, both:
the first universal address; and
at least one parameter of the universal address of the document describing the multimedia content.

2. The method according to claim 1, wherein the at least one universal address generator rule specifies the at least one parameter obtained that needs to be taken into account in order to generate the second universal address for the at least one data segment.

3. The method according to claim 1, wherein the at least one universal address generator rule indicates an order in which at least two parameters that have been obtained need to be taken into account in order to generate the second universal address for the at least one data segment.

4. The method of claim 1, further comprising:
performing the method by a multimedia content server;
receiving a request by the multimedia content server over the communications network for the document from a client terminal, the request using the universal address of the document; and
sending the document to the client terminal over the communications network.

5. A method comprising:
accessing a multimedia content containing at least one data segment that is accessible via a document describing the multimedia content, said document being accessible through a universal address of the document on a communications network, said access to the at least one data segment taking place via a second universal address of the at least one data segment, said accessing comprising:
obtaining the document describing the multimedia content;
generating at least a first universal address of the at least one data segment;
obtaining at least one parameter of the universal address of the document describing the multimedia content;
reading at least one address generator rule in the document describing the multimedia content; and
generating the second universal address for the at least one data segment as a function of the at least one address generator rule, of the first universal address of the at least one data segment, and of the at least one parameter that has been obtained.

6. The method of claim 5, wherein:
the method is performed by a client terminal;
the obtaining the document comprises:
sending a request by the client terminal to a multimedia content server over the communications network for the document, the request using the universal address of the document; and
receiving the document from the multimedia content server over the communications network.

7. A multimedia content server comprising:
a non-transitory computer-readable medium comprising instructions stored thereon; and
a processor configured by the instructions to perform acts comprising:
generating a document that is accessible on a communications network through a universal address of the document, said document describing a multimedia content containing at least one data segment that is accessible via at least a first universal address from said document; and
writing at least one universal address generator rule in the document, said at least one universal address generator rule being configured to generate a second universal address for the at least one data segment on the basis of the first universal address and of at least one parameter of the universal address of the document describing the multimedia content.

8. The multimedia content server of claim 7, wherein the processor is further configured to perform acts comprising:
receiving a request by the multimedia content server over the communications network for the document from a client terminal, the request using the universal address of the document; and
sending the document to the client terminal over the communications network.

9. A terminal suitable for accessing a multimedia content containing at least one data segment that is accessible via a document describing the multimedia content, said document being accessible through a universal address of the document, said access taking place via a second universal address for the at least one data segment, wherein said terminal comprises:
a non-transitory computer-readable medium comprising instructions stored thereon; and
a processor configured by the instructions to perform acts comprising:
obtaining the document describing the multimedia content;
generating at least a first universal address of the at least one data segment;
obtaining at least one parameter of the universal address of the document describing the multimedia content;
reading at least one address generator rule in the document describing the multimedia content; and
generating the second universal address for the at least one data segment as a function of the at least one address generator rule, of the first universal address of the at least one data segment, and of the at least one parameter that has been obtained.

10. The terminal of claim 9, wherein:
the obtaining the document comprises:
sending a request by the terminal to a multimedia content server over a communications network for the document, the request using the universal address of the document; and
receiving the document from the multimedia content server over the communications network.

11. A non-transitory computer-readable medium comprising a computer program stored thereon and including code instructions for performing a method, when the computer program is executed by a processor, wherein the method comprising:
generating a document accessible through a universal address of the document, said document describing a multimedia content containing at least one data segment that is accessible via a first universal address from said document, wherein the generating comprises:
at least one step of writing at least one universal address generator rule accessible through the universal address of the document, said at least one universal address generator rule being suitable for generating a second universal address for the at least one data segment, by taking into account, for generating said second universal address, both:
the first universal address; and
at least one parameter of the universal address of the document describing the multimedia content.

12. The non-transitory computer-readable medium of claim 11, wherein the processor is implemented in a multimedia content server and the method further comprises:
receiving a request by the multimedia content server over a communications network for the document from a client terminal, the request using the universal address of document; and
sending the document to the client terminal over the communications network.

13. A non-transitory computer-readable medium comprising a computer program stored thereon and including code instructions for performing a method, when the computer program is executed by a processor, wherein the method comprising:
accessing a multimedia content containing at least one data segment that is accessible via a document describing the multimedia content, said document being accessible through a universal address of the document, said access to the at least one data segment taking place via a second universal address of the at least one data segment, said accessing comprising:
obtaining the document describing the multimedia content;
generating at least a first universal address of the at least one data segment;
obtaining at least one parameter of the universal address of the document describing the multimedia content;
reading at least one address generator rule in the document describing the multimedia content; and
generating the second universal address for the at least one data segment as a function of the at least one address generator rule, of the first universal address of the at least one data segment, and of the at least one parameter that has been obtained.

14. The non-transitory computer-readable medium of claim 13, wherein:
the processor is implemented in a client terminal; and
the obtaining the document comprises:

sending a request by the client terminal to a multimedia content server over a communications network for the document, the request using the universal address of the document; and receiving the document from the multimedia content server over the communications network.

\* \* \* \* \*